R. A. McKEE.
COMBINED AUTOMATIC THROTTLE AND STOP VALVE.
APPLICATION FILED APR. 14, 1906.
956,595.
Patented May 3, 1910.
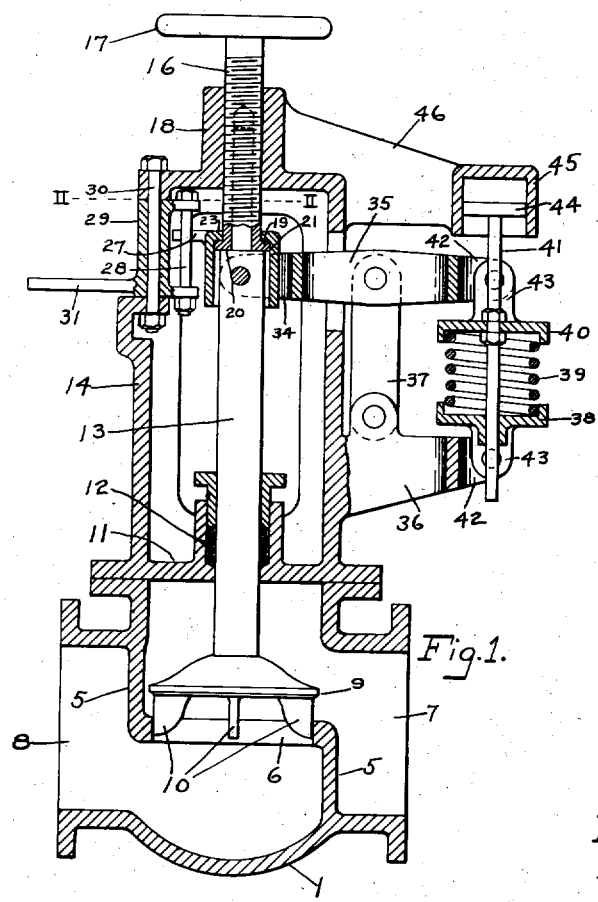
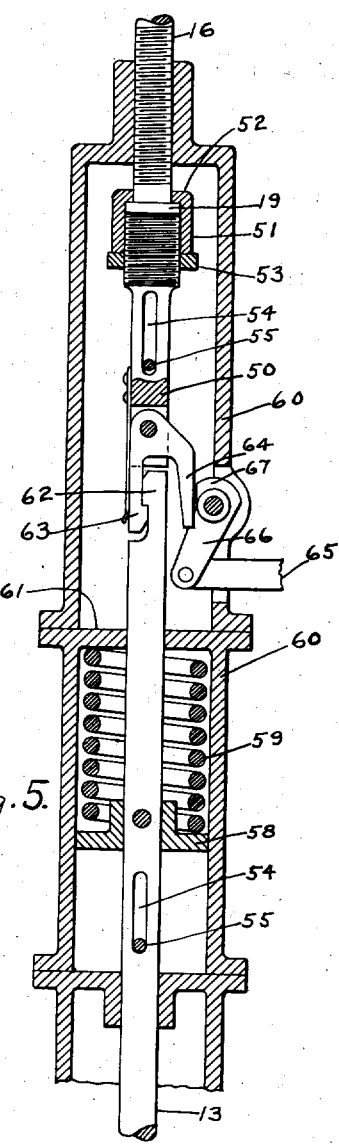
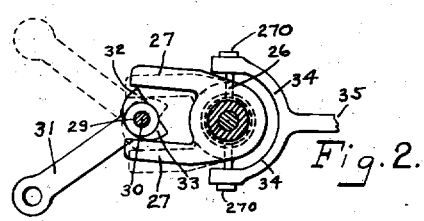
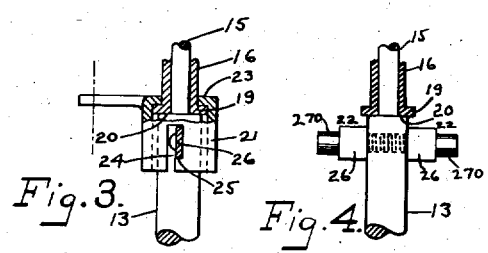
WITNESSES:
D. K. Allison
Ella Brickell
R. A. McKee INVENTOR
BY
G. J. DeWein ATTORNEY.

UNITED STATES PATENT OFFICE.

ROBERT A. McKEE, OF MILWAUKEE, WISCONSIN, ASSIGNOR TO ALLIS-CHALMERS COMPANY, OF MILWAUKEE, WISCONSIN, A CORPORATION OF NEW JERSEY.

COMBINED AUTOMATIC THROTTLE AND STOP VALVE.

956,595.  Specification of Letters Patent.  Patented May 3, 1910.

Application filed April 14, 1906. Serial No. 311,636.

*To all whom it may concern:*

Be it known that I, ROBERT A. MCKEE, a citizen of the United States, residing at Milwaukee, in the county of Milwaukee and State of Wisconsin, have invented certain new and useful Improvements in Combined Automatic Throttle and Stop Valves, of which the following is a specification.

This invention relates to an improvement in valve operating mechanism and particularly to means for quickly and automatically closing the valve independently of the normal closing means.

It is especially adaptable for use in connection with elastic-fluid turbines for controlling the supply of steam or other fluid thereto, and may be connected to the governor or to a separate governor whereby the valve may be quickly and automatically closed when the turbine attains too high a speed or the governor for any reason fails to perform its function. This automatic closing means constitutes a safety stop for shutting off the steam and stopping the engine when abnormal conditions prevail. Obviously this automatic shut-off means is also applicable in various other connections and may be used in any machine wherein it is desirable to automatically operate a valve upon the happening of any certain event, or when any predetermined stage is reached in the operation of the device.

This invention is not limited to any particular kind of valve or for use with any particular fluid, but by its use all accidents due to abnormal conditions of any kind may be prevented through the automatic and positive closing of the valve.

The construction and operation of two of the forms which this invention may assume will now be described in detail, reference being had to the accompanying drawing forming a part of this specification and in which,—

Figure 1 is a section showing a valve provided with one form of the automatic closing device. Fig. 2 is a section on the line II—II of Fig. 1, but showing a slightly modified form of the releasing device. Fig. 3 is a side elevation of the trip device, a portion thereof being shown in section. Fig. 4 is a side elevation of the upper end of the valve stem but at right angles to Figs. 1 and 3. Fig. 5 is a section through a modified form of closing device.

Referring to Figs. 1 to 4 inclusive of the drawings, there is illustrated a valve casing 1, having a diaphragm 5, a port 6 therein whereby the inlet passage 7 communicates with the outlet passage 8 and a valve 9 having guide wings 10 extending through the port 6 and guiding the valve to its seat on the diaphragm. A cap piece 11 forms part of the valve casing, and extending through a suitable stuffing box 12 in said cap piece, is the valve stem 13 by which the valve is operated. The detail structure of the valve and valve casing shown, does not constitute any part of the present invention as it is evident that any form of valve could be used with the automatic closing means shown.

The cap piece 11 carries an open frame 14 for supporting the valve operating mechanism, which will now be described.

The valve stem 13 has its outer end of reduced cross section, forming a shoulder 20 and a spindle extension 15 fitting within a socket in the end of the threaded stem 16, which latter passes through a threaded boss 18 on the frame 14 and is provided with any suitable form of handle 17 for operating the same and controlling the valve 9. The threaded stem 16 has a flange 19 on its inner end resting on the shoulder 20 of the valve stem 13 and normally held in contact therewith by means of a collar 21 and lugs 22 on the valve stem. The collar 21 has a flange 23 resting on the flange 19 of the stem 16 and is provided with slots 24 having off-set portions forming shoulders 25. Supported on the valve stem 13 near its outer end are two oppositely disposed lugs 22 having screw threaded engagement therewith and provided with flat portions 26 adjacent the stem and cylindrical portion 270 at the ends. The collar is slipped over the end of the valve stem 13 with the flat portions 26 of the lugs extending through the slots 24. The collar is then given a slight turn so that the shoulders 25 come below the flat portions 26 of the lugs and thus securely hold the valve stem 13 and the threaded operating stem 16 together. The valve 9 may thus be opened and closed at will by means of the handle 17 and the connecting means above described.

When the machine which is controlled by this mechanism attains too high a speed, has accomplished any desired result, or in any way reaches a predetermined limiting condition, it is desirable that the supply of fluid be automatically and quickly cut off. The drawings illustrate several forms of apparatus capable of attaining this object. In Fig. 1 the collar 21 is provided with two substantially parallel arms 27 between which extends a rod or bar 28 carried by two lugs on a sleeve 29. This sleeve is pivoted on a bolt 30 secured in the side of the frame 14 and may be oscillated by means of an outwardly extending arm 31 which is normally in a position near one of its limits of oscillation, where, by means of the rod 28 and arms 27, the collar 21 is held in one of its limiting positions with the lugs 26 on the shoulders 25. The end of the arm 31 may be connected to the governor of the engine, or to a separate governor, or to any suitable indicator or controller capable of moving the arm 31, whereby the collar is oscillated, the shoulder 25 removed from beneath the flat portion 26 of the lug and the valve stem permitted to descend and close the valve 9. If desired, the arm 31 may be left free at its outer end without connecting it to any other part and may constitute merely an emergency means for quickly closing the valve when to close it by means of the handle 17 would take too long time.

A slightly modified form of releasing means which may be the preferred form, is shown in Fig. 2. Here the arms 27 are shown farther apart, and instead of a rod 28 being used, the sleeve 29 is semi-cylindrical thus forming two projections 32, 33, against which the arms 27 bear. The arm 31 when in the position shown in solid lines, has the projection 32 beyond the normal to the arm 27 which passes through the pivot 30. Thus any tendency of the collar to turn with the stem 16 by reason of friction will be resisted, as pressure on the projection 32 will only tend to swing the arm 31 still farther and this means therefore constitutes a lock. When the arm 31 is swung to the position shown in dotted lines, the arms 27 are moved, the collar 21 oscillated and the valve stem released, the same as in the form shown in Fig. 1.

For more quickly and surely closing the valve when released in the manner above described, suitable spring actuated means may be provided. As shown in Fig. 1, the lugs 22 have cylindrical extension 270 beyond the flat portions 26, and mounted on these extensions are the yoke arms 34 of a lever 35. The frame 14 is provided with an arm 36 carrying a link 37 which acts as a fulcrum for the lever and also carrying a base plate 38 for a spring 39. The other plate 40 for the spring is carried by the lever 35 and the two plates are kept in alinement by means of a rod 41 passing through the centers of both and secured to the lever plate 40 in any suitable manner. The two plates 38 and 40 are preferably secured to the arm 36 and lever 35 by means of lugs 43 pivotally fastened to yoke-arms 42 on the arm 36 and lever 35, whereby the motion of the lever may be accommodated for without moving the rod other than longitudinally. To prevent the valve from being injured by closing too rapidly, the rod 41 is provided with a piston 44 fitting into a dash-pot 45 carried by an arm 46 on the frame 14.

When the arm 31 has been moved so as to release the valve stem 13, and the spring has forced the same down, the valve will remain shut until reopened in the following manner. The stem 16 is screwed down, by means of the handle 17, until the lugs 26 reach the end of the slots 24 and the stem 16 contacts with the valve stem 13, the arm 31 is swung back to its original position which brings the shoulders 25 under the lugs 26 and the valve may then be opened and closed at will by means of the handle 17. The spring acts upon the valve at all times, tending to close it, and by this downward pressure of the lugs 26 on the shoulders 25, the two are less liable to become accidentally displaced.

In Fig. 5 there is illustrated a form of this invention wherein somewhat different means are utilized for closing the valve than that shown in Fig. 1. The threaded stem 16 and flange 19 are secured to connecting links 50 by means of a collar 51 screw threaded to the link 50 and having a flange 52 fitting over the flange 19. A lock nut 53 may be used in connection with the collar 51 to more securely hold it in place. Both the connecting link 50 and the valve stem 13 are prevented from rotating by providing each with a longitudinal slot 54 having a pin 55 passing therethrough and secured to the frame 60. The valve stem 13 carries a flanged collar 58 acting as the supporting plate for a coil spring 59 held between it and a cross plate 61 in the frame. This spring 59 normally tends to force the valve stem 13 down and close the valve. The emergency releasing means utilized in this form consists of a hook 62 on the end of the valve stem 13, a pivoted spring pressed latch 63 on the link 50 and means for disengaging the latch from the hook. The latch 63 carries an arm 64 in the line of movement of a lug or cam 67 pivoted in the frame 60 and operated by a lever arm 66 integral therewith and connected to a link or handle 65. By pulling out on the link or handle 65, the lug or cam 67 contacts with the arm 64, moves it inward and disengages the latch 63 from the hook 62, whereby the valve is closed by the action of the spring 59. When it is desired to open the valve, the stem 16 is screwed down until the bevel pointed latch and hook slide past each other and become reëngaged. The valve is then again under direct control from the threaded stem 16 by which it is normally operated.

Having thus described my invention, what I claim as new and desire to secure by Letters Patent, is:—

1. The combination of a valve, manually operable screw-threaded means for moving said valve, means for connecting said valve with said screw-threaded means, means for automatically closing said valve, and movable means for disconnecting and connecting means, said disconnecting means being free from interference by said screw-threaded means during any manual operation thereof.

2. The combination of a valve, manually operable screw-threaded means for moving said valve, means for connecting said valve with said screw-threaded means, means for automatically closing said valve by separation from said screw-threaded means, and movable means for disconnecting said connecting means.

In testimony whereof I affix my signature in presence of two witnesses.

ROBERT A. McKEE.

Witnesses:
JOHN DAY, Jr.,
MAX ROTTER.

---

Correction in Letters Patent No. 956,595.

It is hereby certified that in Letters Patent No. 956,595, granted May 3, 1910, upon the application of Robert A. McKee, of Milwaukee, Wisconsin, for an improvement in "A Combined Automatic Throttle and Stop Valve," an error appears in the printed specification requiring correction as follows: Page 3, line 11, the word "and" should read *said;* and that the said Letters Patent should be read with this correction therein that the same may conform to the record of the case in the Patent Office.

Signed and sealed this 14th day of June, A. D., 1910.

[SEAL.]

C. C. BILLINGS,
*Acting Commissioner of Patents.* from the threaded stem 16 by which it is normally operated.

Having thus described my invention, what I claim as new and desire to secure by Letters Patent, is:—

1. The combination of a valve, manually operable screw-threaded means for moving said valve, means for connecting said valve with said screw-threaded means, means for automatically closing said valve, and movable means for disconnecting and connecting means, said disconnecting means being free from interference by said screw-threaded means during any manual operation thereof.

2. The combination of a valve, manually operable screw-threaded means for moving said valve, means for connecting said valve with said screw-threaded means, means for automatically closing said valve by separation from said screw-threaded means, and movable means for disconnecting said connecting means.

In testimony whereof I affix my signature in presence of two witnesses.

ROBERT A. McKEE.

Witnesses:
JOHN DAY, Jr.,
MAX ROTTER.

---

Correction in Letters Patent No. 956,595.

It is hereby certified that in Letters Patent No. 956,595, granted May 3, 1910, upon the application of Robert A. McKee, of Milwaukee, Wisconsin, for an improvement in "A Combined Automatic Throttle and Stop Valve," an error appears in the printed specification requiring correction as follows: Page 3, line 11, the word "and" should read *said*; and that the said Letters Patent should be read with this correction therein that the same may conform to the record of the case in the Patent Office.

Signed and sealed this 14th day of June, A. D., 1910.

[SEAL.]

C. C. BILLINGS,
*Acting Commissioner of Patents.*

Correction in Letters Patent No. 956,595.

It is hereby certified that in Letters Patent No. 956,595, granted May 3, 1910, upon the application of Robert A. McKee, of Milwaukee, Wisconsin, for an improvement in "A Combined Automatic Throttle and Stop Valve," an error appears in the printed specification requiring correction as follows: Page 3, line 11, the word "and" should read *said;* and that the said Letters Patent should be read with this correction therein that the same may conform to the record of the case in the Patent Office.

Signed and sealed this 14th day of June, A. D., 1910.

[SEAL.]

C. C. BILLINGS,
*Acting Commissioner of Patents.*